350-96.17

United States Patent [19]
Winzer et al.

[11] 4,059,337
[45] Nov. 22, 1977

[54] OPTICAL COUPLING DEVICES

[75] Inventors: Gerhard Winzer; Walter Rauscher, both of Munich, Germany

[73] Assignee: Siemens Aktiengesellschaft, Berlin & Munich, Germany

[21] Appl. No.: 674,066

[22] Filed: Apr. 6, 1976

[30] Foreign Application Priority Data

Apr. 17, 1975 Germany ............................ 2517072

[51] Int. Cl.$^2$ ............................................. G02B 5/14
[52] U.S. Cl. ............................ 350/96 C; 350/96 WG
[58] Field of Search ......................... 350/96 C, 96 WG

[56] References Cited
U.S. PATENT DOCUMENTS

| 3,833,284 | 9/1974 | Kaminow et al. | 350/96 C |
| 3,980,392 | 9/1976 | Auracher | 350/96 C |

FOREIGN PATENT DOCUMENTS

| 2,432,653 | 1/1976 | Germany | 350/96 C |

OTHER PUBLICATIONS

Tien et al., "Formation of Lightguiding Interconnections...", Applied Optics, vol. 12, No. 8, Aug. 1973, pp. 1909–1916.

Primary Examiner—John K. Corbin
Assistant Examiner—Stewart Levy
Attorney, Agent, or Firm—Hill, Gross, Simpson, Van Santen, Steadman, Chiara & Simpson

[57] ABSTRACT

An optical coupling device for coupling of integrated optical components which are arranged on separate component substrates that may have different thicknesses characterized by a base substrate, at least two component substrates disposed on the base substrate and arranged closely adjacent to each other, an intermediate substrate disposed between the two component substrates and in engagement therewith, and at least one waveguide disposed on a surface of the intermediate substrate and coupled to two optical components on their respective component substrates. Preferably, the intermediate substrate, which may be either a band, fiber, a portion of a cylindrical rod, or an integral portion of one of the component substrates, provides a curved surface which enables bridging the space between the two component substrates and allows compensation for different thicknesses therebetween.

12 Claims, 5 Drawing Figures

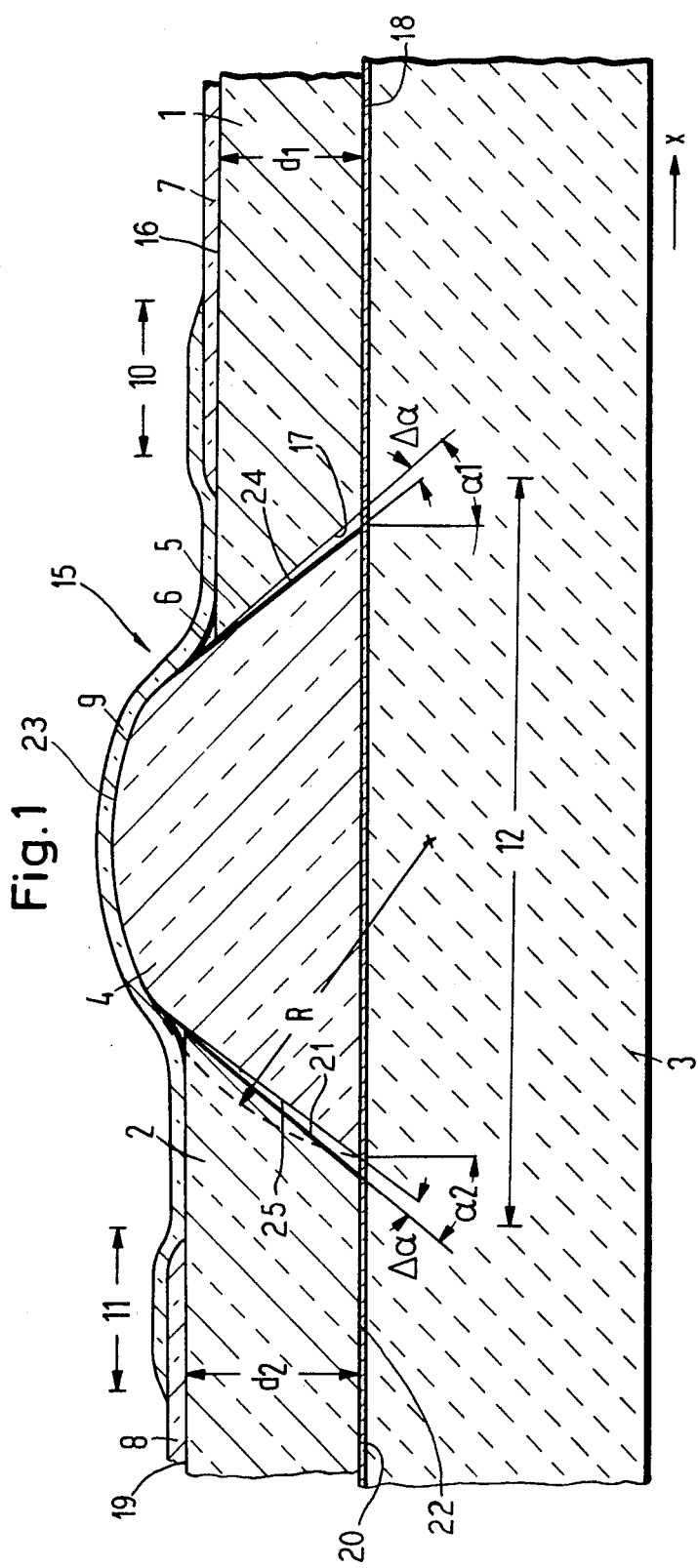

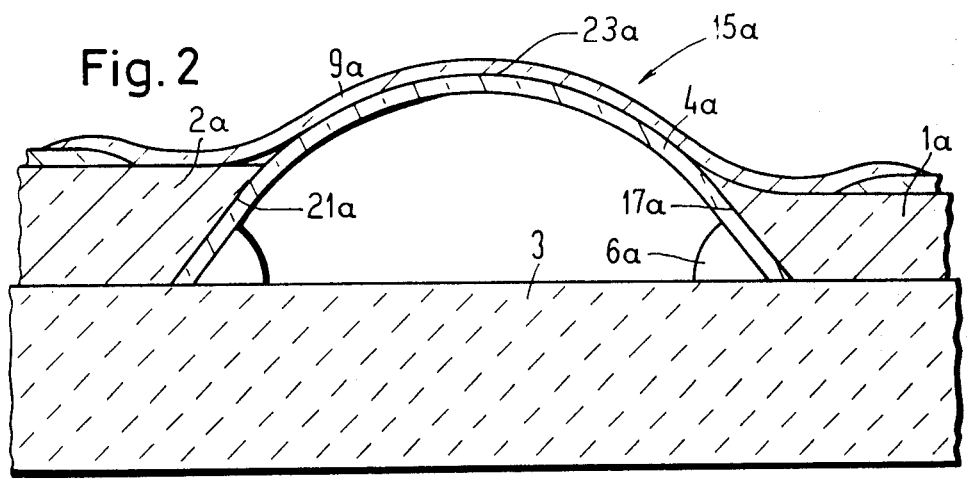
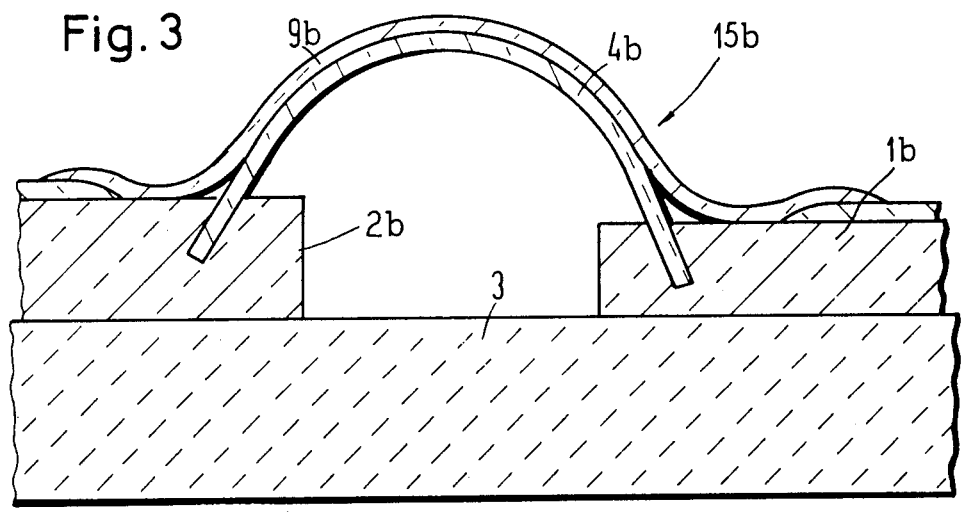
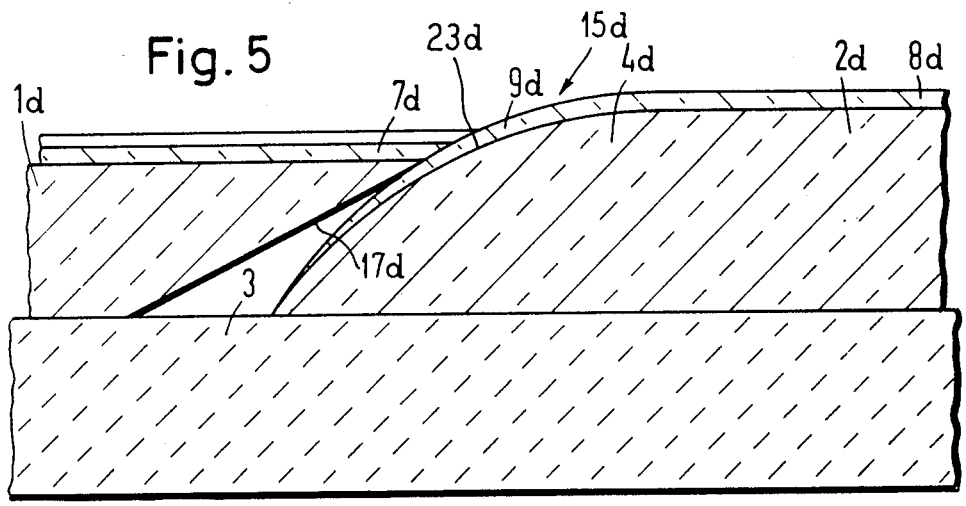

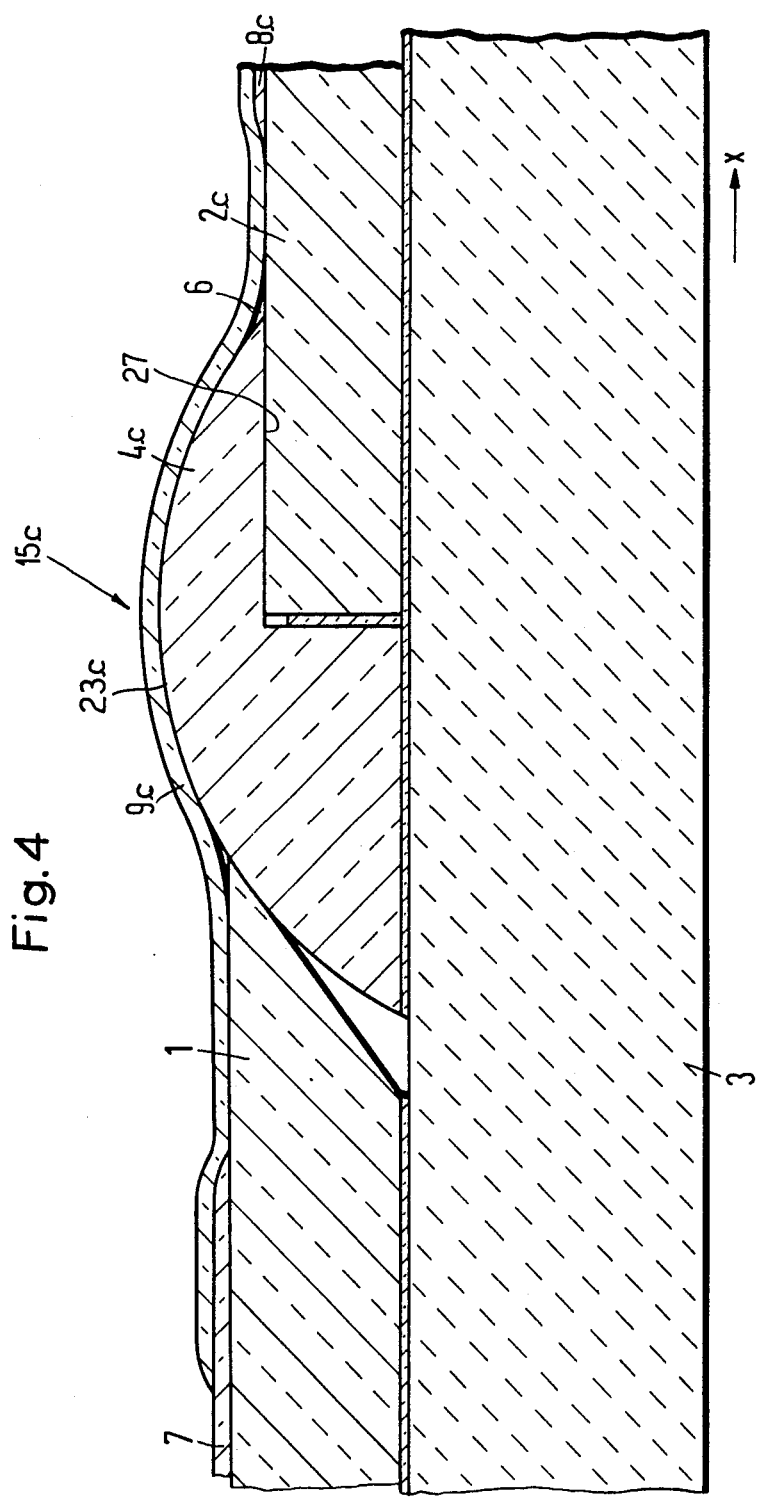

OPTICAL COUPLING DEVICES

BACKGROUND OF THE INVENTION

1. Field of the Invention

The present invention is directed to an optical coupling device for coupling integrated optical components formed on separate substrates and for providing height compensation.

2. Prior Art

If monolith technology is not used in the production of integrated optical circuits, the waveguide and substrate materials for each of the components may be optimally selected for each component according to the function of the component and the desirability of making this selection has been increasing recently. However, the waveguides of each of the component substrates must be optimally connected to one another on a common base substrate. A typical example for the necessity of waveguide connection of separate component substrates is present in the connecting of the waveguide laser with an external waveguide modulator. For example, the waveguide laser is produced in an epitaxial $Nd^{3+}$ : YAG layer on a sapphire component substrate and the waveguide modulator is an epitaxial $LiNbO_3$ layer on a suitable substrate of another crystal material. The laser and the modulator must then be coupled together.

Since the thickness of the waveguides, which are used, is in the order of magnitude of micrometers and the mode behavior is not to be disturbed by undefined coupling points, for example such as light guiding lacquer drops or other immersion materials, the connecting of integrated optical components has been technologically very expensive. Thus, an optimum connection of the waveguide pieces, which have been formed on various component substrates, could, up to the present, only be achieved in the following process. Each of the component substrates were cut from a common block, flat polished on both sides to a smoothness of $\lambda/10$ and then subsequently wrung onto a base substrate which was also polished flat to a smoothness of $\lambda/10$.

For the production of this type of aligned waveguide connection in hybrid technology, a considerable technological and labor expenditure was necessary. While the labor costs and technological costs are acceptable for fundamental research in a laboratory, these costs in both time and labor are not acceptable for commercial applications of the hybrid integrated optical components.

SUMMARY OF THE INVENTION

The present invention is directed to an optical coupling device which provides height compensation for integrated optical components and which device reduces the technological requirements as to precision and therefore reduces expenses of forming the coupling.

To accomplish these objections, the present invention provides the optical coupling device for coupling optical components which are arranged on separate component substrates which may have different thicknesses, and the coupling device comprises a base substrate, at least two component substrates disposed on the base substrate and arranged closely adjacent each other, each of said component substrates having an integrated optical component disposed thereon, an intermediate substrate disposed between the two component substrates and in engagement therewith, and at least one waveguide disposed on the surface of the intermediate substrate and coupled to the optical components on the respective component substrates.

Preferably, the surface of the intermediate substrate is a curved surface which provides a bridge between the component substrates to support a waveguide bridge which has a geometrically constant connection. The intermediate substrate can advantageously be formed from a section of a cylindrical rod which has a pair of facets running parallel to the axis of the rod. In embodiments of the invention, the intermediate substrate is formed by a band of material or by a fiber each of which are mounted between the component substrates to present a curved configuration for bridging the space therebetween. In another embodiment of the invention, the intermediate substrate is provided with a recess for receiving an end of one of the component substrates so that a portion of the intermediate substrate overlies a surface of the one component substrate. In the final embodiment of the present invention, the intermediate substrate is integrally formed with one of the component substrates and has a curved surface engaging the other component substrate. In each of the embodiments for certain cases, it may be desirable to provide a dielectric auxiliary layer which is interposed between the surface of the substrate and each of the waveguides disposed thereon.

BRIEF DESCRIPTION OF THE DRAWINGS

FIG. 1 is a cross-sectional view of an optical coupling device in accordance with the present invention;

FIG. 2 is a cross-sectional view of an embodiment of the optical coupling device of the present invention;

FIG. 3 is a cross-sectional view of a second embodiment of the optical coupling device of the present invention;

FIG. 4 is a cross-sectional view of a third embodiment of an optical coupling device of the present invention; and FIG. 5 is a cross-sectional view of a fifth embodiment of the optical coupling device in accordance with the present invention.

DESCRIPTION OF THE PREFERRED EMBODIMENTS

The principles of the present invention are particularly useful when incorporated in an optical coupling device generally indicated at 15 in FIG. 1.

In the coupling device 15, a component substrate 1 has an upper surface 16 on which a waveguide 7 is disposed and has an end surface 17, a bottom surface 18, and a thickness $d_1$. In a similar manner, a component substrate 2 has an upper surface 19 on which a waveguide 8 is disposed and has a bottom surface 20, an end surface 21, and a thickness $d_2$. The component substrates 1 and 2 are disposed on a base substrate 3 with their end surfaces 17 and 21, respectively, facing each other and the upper surfaces 16 and 19 have a height difference $\Delta d = d_2 - d_1$. The end surfaces 17 and 21 are each formed at an angle to their respective upper surfaces 16 and 19 to form a wedge-shape that extends in a direction $x$ which is the expansion direction of a wave traveling in the waveguides 7 and 8. The lower surfaces 18 and 20 of the component substrates 1 and 2 do not need to be precision polished because the component substrates 1 and 2 are attached on the base substrate 3 by a cement layer 22 instead of the wrung on attachment that was previously used.

An intermediate substrate 4, which has a curved surface 23, is disposed between the component substrates 1 and 2 and, as illustrated, bridges the space between the end surfaces 17 and 21. A waveguide 9 is applied to the surface 23, portions of the surfaces 16 and 19 to couple with each of the waveguides 7 and 8.

To assemble the coupling device 15, one of the component substrates such as 1 is fastened on the base substrate 3. Then the intermediate substrate is fastened on the substrate 3 after it has been pushed to a point of contact against a sharp edge 5 of the component substrate 1. Subsequently, the component substrate 2 is correspondingly attached on the substrate 3 with its sharp edge formed by the surfaces 19 and 21 engaging the intermediate substrate 4. Then the waveguide 9, which forms a waveguide bridge, is applied by vapor depositing or a sputtering process.

The intermediate substrate 4 is illustrated as a longitudinal section of a cylindrical rod which has a radius R. The section forming the intermediate substrate has been provided with two facets 24 and 25 which extend parallel to the axis of the rod and provides contact surfaces for engaging the edge such as 5. As illustrated, the end surfaces 17 extend at an angle $\alpha 1$ to a normal of the upper surface 16 and the surface 21 extends at an angle $\alpha 2$ to a normal of the upper surface 19 of the component substrate 2. The surfaces 17 and 21 of the component substrates have been processed so that they diverge by a small angular difference $\Delta \alpha$ from the flat facets 24 and 25, respectively, with the amount of diversions being directed away from the upper surfaces of the component substrate so that the hollow open space occurs adjacent the substrate 3. Thus, a sharp contact edge 5 which is formed by the surfaces 17 and 16 of the component 1 engages the intermediate substrate 4 with a sharp contact and, as illustrated, engages the facet 24. If desired, a small amount of joining material 6 of a suitable index of refraction may be placed at the point of engagement. The intermediate substrate 4 has a radius R and if facets such as 24 and 25 are present, the angle of inclinations are selected so that the surface curvature proceeds uniformly at the contact points such as the engagement of the edge 5 with the surface 23 so that the surface curvature of the waveguide 9 is minute enough in order to avoid large radiation losses.

The index of refraction for the intermediate substrate 4, the joining material 6 are selected to match the index of refraction of the waveguides 7 and 8, which are to be coupled, and the index of refraction of the waveguide 9 so that a wave-leak-free conduction of light in the waveguide bridge 9 between the two component substrates 1 and 2 occurs. The waveguide 9 is coupled to the waveguide 7 in the region 10 and is also coupled to the waveguide 8 in a region 11. In a region 12, an additional dielectric auxiliary layer can be placed on the curved surface 23 and portions of the upper surfaces 16 and 19 of the component substrates 1 and 2. Both the auxiliary layer and the material forming the waveguide bridge 9 can be applied by vapor depositing, sputtering or other processes in a desired thickness to match the waveguides 7 and 8.

An embodiment of the optical coupling device is generally indicated at 15a in FIG. 2. In this embodiment, instead of using a section of a cylindrical rod as intermediate substrate, a band 4a is utilized. The band 4a is clamped against the end surfaces 17a and 21a of substrates 1a and 2a by joining materials such as 6a. As illustrated, the band 4a has a width greater than the distance between the surfaces 17a and 21a so that when it is clamped in the particular arrangement, it is in a curved configuration to provide a curved supporting surface 23a for one or more waveguides 9a which form the waveguide bridges.

A second embodiment of the optical coupling device is generally illustrated at 15b in FIG. 3. In the second embodiment, the intermediate substrate is formed by fibers 4b which have a length greater than the distance between the component substrates 1b and 2b. The ends of the fiber 4b are mounted such as in the component substrates 1a and 2b, respectively, to hold the fiber in a bent configuration as illustrated in FIG. 3. As illustrated, the fiber 4b forms a curved bridge for a waveguide bridge 9b.

A third embodiment of the optical coupling device is generally indicated at 15c in FIG. 4. In the third embodiment, an intermediate substrate 4c has a curved surface 23c and is provided with a recess 27. As illustrated, the recess 27 receives an end surface of a component substrate 2c with a portion of the recess resting on the upper surface of the component substrate 2c. With the additional contact surface between the intermediate substrate 4c and the component substrate 2c, a large area contact surface is created which improves the coupling characteristic of the junction of the waveguide bridge 9c to a waveguide 8c on the surface of the component 2c.

A fourth embodiment of the optical coupling device is generally indicated at 15d in FIG. 5. In this embodiment, the intermediate coupling 4d is integrally formed on a component substrate 2d, which is thicker than a component substrate 1d. As illustrated, an edge portion of a component substrate 2d is formed with a curved surface 23d. To form a waveguide bridge 9d, the waveguide 8d on the component substrate 2d is extended onto the curved surface 23d and is provided with a tapering end. The other component substrate 1d has a waveguide 7d which may be a laser diode, and extends to the inclined end surface 17d. The component substrate 1d is attached to the base substrate 3 with the end of the waveguide 7d engaging the tapering portion of the waveguide bridge 9d so that the waveguide 7d is therefore coupled onto a slightly higher situated waveguide 8d with low losses.

Utilizing the principles of the present invention, practical integrated optical components were coupled together. The component substrates such as 1 and 2 consist of quartz with an index of refraction $n = 1.47$ and the height $d_1 = 0.8$ mm and $d_2 = 0.6$ mm. The intermediate substrate also consists of quartz. The waveguides 7 and 8 plus the waveguide 9 forming the waveguide bridge consisted of 0.5 $\mu$m thick layers of $Al_2O_3$ which has an index of refraction of $n = 1.63$. For a joining material 6, Cinnamaldehyde has proven to be satisfactory.

Although various minor modifications may be suggested by those versed in the art, it should be understood that we wish to employ within the scope of the patent warranted hereon, all such modifications as reasonably and properly come within the scope of our contribution to the art.

We claim:

1. An optical coupling device for coupling of integrated optical components which are arranged on separate component substrates that may have different thicknesses, said coupling device comprising a base substrate, at least two component substrates disposed on the base substrate and arranged closely adjacent to each other, each of said component substrates having an integrated optical component disposed thereon, an intermediate substrate disposed between the two component substrates and in engagement therewith, and at least one waveguide disposed on a surface of the intermediate substrate and coupled to the optical components on the respective component substrates.

2. An optical coupling device according to claim 1, which further includes a dielectric auxiliary layer interposed between the surface of the intermediate substrate and each of the waveguides.

3. An optical coupling device according to claim 1, wherein at least a portion of the surface on which the waveguides are disposed is a curved surface.

4. An optical coupling device according to claim 3, which further includes a dielectric layer interposed between said curved surface and each of the waveguides.

5. An optical coupling device according to claim 1, wherein the intermediate substrate is a section of a cylindrical rod having a pair of facets extending parallel to the axis of the rod.

6. An optical coupling device according to claim 1, which further includes a dielectric layer interposed between a surface of the substrate and each of the waveguides.

7. An optical coupling device according to claim 1, wherein the intermediate substrate is a band, said band being mounted between the adjacent component substrates to present a curved configuration for bridging the space between the component substrates.

8. An optical coupling device according to claim 7, which includes a dielectric layer interposed between the curved surface of the band and each waveguide.

9. An optical coupling device according to claim 1, wherein the intermediate substrate comprises a fiber, said fiber being mounted between the adjacent component substrates in a manner to present a bridge having a curved configuration.

10. An optical coupling device according to claim 9, which includes a dielectric layer interposed between the fiber and the waveguide.

11. An optical coupling device according to claim 1, wherein the intermediate substrate contains a recess for receiving an end of one of the component substrates so that a portion of the intermediate substrate overlies a surface thereof.

12. An optical coupling device according to claim 1, wherein the intermediate substrate is integrally formed with one of the component substrates and has a curved surface engaging the other component substrate.

* * * * *